Patented Aug. 29, 1939

2,171,334

UNITED STATES PATENT OFFICE 2,171,334

ELECTRICAL INSULATION

Raymond M. Fuoss, Schenectady, N. Y., assignor to General Electric Company, a corporation of New York No Drawing. Application March 10, 1937, Serial No. 130,097

6 Claims. (Cl. 106—15)

This invention relates to electrical insulation and particularly to electrical insulation compositions containing plasticized polymerized vinyl halides, such as polymerized vinyl chloride.

A polymerized vinyl halide, such as polymerized vinyl chloride, when plasticized with a plasticizer, for example, tricresyl phosphate, produces a rubber-like resinous composition which is, however, electrically poor in character. It exhibits high electrical losses (conductance), particularly at elevated temperatures, which increase with time at elevated temperatures.

In a copending application of Moyer M. Safford, Serial No. 67,639, filed Mar. 7, 1936, now Patent No. 2,118,017, granted May 17, 1938, and assigned to the same assignee as the present invention, it is pointed out that the electrical losses of plasticized polymerized vinyl chloride may be reduced to a very marked degree by the incorporation therein of an oxide of lead (PbO) and finely divided carbon black. Such compositions are therefore adapted to be used at higher voltages than unmodified plasticized polymerized vinyl chloride. Although they constitute a tremendous improvement in the electrical insulation of conductors, the Safford compositions still exhibit an increase in conductance at elevated temperature over a prolonged period of time.

I have discovered plasticized polymerized vinyl halide compositions which exhibit low electrical losses at elevated temperatures that are practically independent of time.

In accordance with my invention I have found after considerable research, that plasticized polymerized vinyl halide compositions can be electrically stabilized by the addition thereto of lead resinate, preferably in conjunction with an oxide of lead and an adsorbing agent such as fuller's earth or carbon black.

In carrying out my invention I dissolve the lead resinate in the plasticizer, tricresyl phosphate being a typical plasticizer, the resultant solution being added to the polyvinyl halide. After mixing, the product is compounded thoroughly at elevated temperature, for example at 100° C. to 110° C. between heated differential rollers. The homogeneous sheet obtained may be used in known manner for insulating conductors by extrusion, by strip covering or by other suitable methods.

In order to illustrate the marked improvement in electrical characteristics obtained by means of my invention the following table is given in which is set forth the results of tests on various compositions containing plasticized polymerized vinyl chloride. The samples tested were prepared as described above, a disc 4" in diameter and 200 mils thick being pressed from the sheeted material. The pressing was 5 minutes at 150° C. at a pressure of approximately 2500 pounds per square inch. The disc was mounted between test electrodes in an air thermostat at 120° C. and the electrical properties at 60 cycles measured at intervals during an aging period of 6 to 10 hours at 120° C. All samples contained approximately 60 parts polymerized vinyl chloride to 40 parts tricresyl phosphate by weight. The other ingredients and their parts by weight in 100 parts are given in the first column of the table. The table shows, respectively, the loss factors at 120° C., first as soon as temperature equilibrium was attained, and second, after about 6 hours' subsequent aging at 120° C.

| No. | Added to 40 : 60 plastic | Loss factor at 120° C. ($\epsilon''$) | |
|---|---|---|---|
| | | Initial | After 6 hrs. |
| 92 | Nothing | 3870 | 5310 |
| 93 | 0.5 lead resinate | 137 | 159 |
| 94 | 1.0 lead resinate | 129 | 140 |
| 95 | 2.0 lead resinate | 92 | 89 |
| 96 | 4.0 lead resinate | 55 | 49 |
| 97 | 3.7 lead resinate+4.6 fuller's earth | 41 | 28 |
| 98 | 3.7 lead resinate+4.6 carbon black | 65 | 60 |
| 109 | 2.4 PbO | 33 | 69 |
| 106 | 2.4 PbO+lead resinate | 35 | 36 |
| 107 | 2.4 PbO+2.4 carbon | 36 | 92 |
| 108 | 2.3 PbO+2.3 carbon+2.3 lead resinate | 28 | 30 |
| 110 | 5 PbO+5 carbon | 29 | 118 |
| 111 | 2.5 PbO+2.5 lead resinate+5 carbon | 38 | 41 |
| 112 | 2.5 PbO+2.5 lead resinate+5 fuller's earth | 15 | 14 |

As shown in the table, the first sample, No. 92, was the control sample containing 60 parts of polymerized vinyl chloride and 40 parts of tricresyl phosphate. It will be observed that this composition has, as compared to the others, an enormous conductance, which increases rapidly on heating. It will next be observed that as little as 0.5% lead resinate reduced the conductance to about one-thirtieth of this value and the sample showed only a slight increase in loss factor on standing at 120° C. Samples Nos. 93 to 96 contain gradually increasing amounts of lead resinate and show further improvement in initial conductance and in age resistance. Nos. 97 and 98 include an adsorbing agent, fuller's earth giving better results than carbon black.

Samples Nos. 106 to 109 show the effect of replacing part of the lead oxide of the Safford composition with lead resinate. It will be observed that $\epsilon''$ at 120° C. for Nos. 106 and 108 was unaffected by heating, while the conductance of the samples Nos. 107 and 109 which did not contain lead resinate more than doubled in six hours' heating at 120° C. Sample No. 110 is a typical Safford composition containing PbO and C. Nos. 111 and 112 are variations of No. 110 obtained by substituting first lead resinate for part of the oxide and then fuller's earth for the carbon black. This again shows that the presence of lead resinate electrically stabilizes the compound.

The addition of lead resinate to the plasticized polymerized vinyl halide accomplishes two results from the practical standpoint, viz., it prevents the conductance from reaching large values as a result of hot milling and hot pressing of the composition which operations are necessary in preparing the composition for electrical insulation purposes; and it also maintains this low value of conductance for a considerable period of subsequent heat aging, which, as will be obvious, is highly important in the use of the composition for high voltage and high temperature insulation.

What I claim as new and desire to secure by Letters Patent of the United States, is:

1. Electrical insulation with stable electrical losses at elevated temperature comprising a plasticized polymerized vinyl halide and lead resinate.

2. Electrical insulation with stable electrical losses at elevated temperature comprising a plasticized polymerized vinyl halide, lead resinate and an adsorbing agent.

3. Electrical insulation with stable electrical losses at elevated temperature comprising a plasticized polymerized vinyl halide, lead resinate, lead oxide and an adsorbing agent.

4. Electrical insulation with stable electrical losses at elevated temperature comprising plasticized polymerized vinyl chloride, lead resinate, lead oxide and fuller's earth.

5. Electrical insulation with stable electrical losses at elevated temperature comprising plasticized polymerized vinyl chloride, lead resinate, lead oxide and carbon black.

6. The method of electrically stabilizing plasticized polymerized vinyl halide compositions at elevated temperatures which comprises incorporating therewith a relatively small proportion of lead resinate.

RAYMOND M. FUOSS.